US008669865B2

(12) United States Patent
Al-Rehaili et al.

(10) Patent No.: US 8,669,865 B2
(45) Date of Patent: Mar. 11, 2014

(54) PERSONAL SAFETY AND LOCATOR DEVICE

(75) Inventors: Abdullah Ghazi M. Al-Rehaili, Almadina Almonowara (SA); Ahmed G. Al-Rehaili, Almadina Almonawara (SA)

(73) Assignee: King Saud University, Riyadh (SA)

( * ) Notice: Subject to any disclaimer, the term of this patent is extended or adjusted under 35 U.S.C. 154(b) by 458 days.

(21) Appl. No.: 12/762,300

(22) Filed: Apr. 16, 2010

(65) Prior Publication Data

US 2010/0308992 A1  Dec. 9, 2010

Related U.S. Application Data

(63) Continuation-in-part of application No. 12/697,009, filed on Jan. 29, 2010, now abandoned.

(51) Int. Cl.
*G08B 1/08* (2006.01)

(52) U.S. Cl.
USPC ............... 340/539.13; 340/539.1; 340/539.11

(58) Field of Classification Search
USPC .............. 340/539.13, 573.1, 573.6, 945, 963, 340/966, 961, 539.18, 539.2, 435, 436, 340/572.1
See application file for complete search history.

(56) References Cited

U.S. PATENT DOCUMENTS

| | | | | |
|---|---|---|---|---|
| 4,612,667 A | * | 9/1986 | Hansen | 455/98 |
| 5,157,407 A | * | 10/1992 | Omiya | 342/359 |
| 5,686,888 A | * | 11/1997 | Welles et al. | 340/539.13 |
| 5,728,287 A | * | 3/1998 | Hough et al. | 205/743 |
| 6,278,370 B1 | * | 8/2001 | Underwood | 340/573.1 |
| 6,321,084 B1 | * | 11/2001 | Horrer | 455/431 |
| 6,557,801 B1 | * | 5/2003 | Gevay | 244/140 |
| 6,789,013 B2 | * | 9/2004 | Annett et al. | 701/468 |
| 2001/0016825 A1 | * | 8/2001 | Pugliese et al. | 705/5 |
| 2002/0053974 A1 | * | 5/2002 | Beken | 340/539 |
| 2002/0107916 A1 | * | 8/2002 | Nii et al. | 709/203 |
| 2006/0119480 A1 | * | 6/2006 | Hachiga | 340/572.1 |
| 2007/0229268 A1 | * | 10/2007 | Swan et al. | 340/572.1 |
| 2008/0068220 A1 | * | 3/2008 | Giesa et al. | 340/945 |
| 2009/0121931 A1 | * | 5/2009 | Katz | 342/357.09 |
| 2009/0224966 A1 | * | 9/2009 | Boling et al. | 342/357.1 |
| 2010/0318288 A1 | * | 12/2010 | Korn et al. | 701/201 |

* cited by examiner

*Primary Examiner* — Kerri McNally
(74) *Attorney, Agent, or Firm* — James A. Sheridan; Hart IP Law & Strategies

(57) ABSTRACT

An automatically provisioned passenger safety and locator device is described. In one aspect, the locator device includes a microcontroller with a processor coupled to the memory comprising computer-program instructions executable by the processor that, responsive to activation, detects a seat number for the seat of a plurality of seats coupled to a transportation vehicle. The seat is in proximity to and in association with the tracking apparatus. Additionally, the computer program instructions generate and communicate a signal to a search and rescue center. The signal includes the seat number and location coordinates of the tracking apparatus. The seat number is utilized by the search rescue team to facilitate respective operations by determining personal information associated with any passenger assigned to the seat.

19 Claims, 4 Drawing Sheets

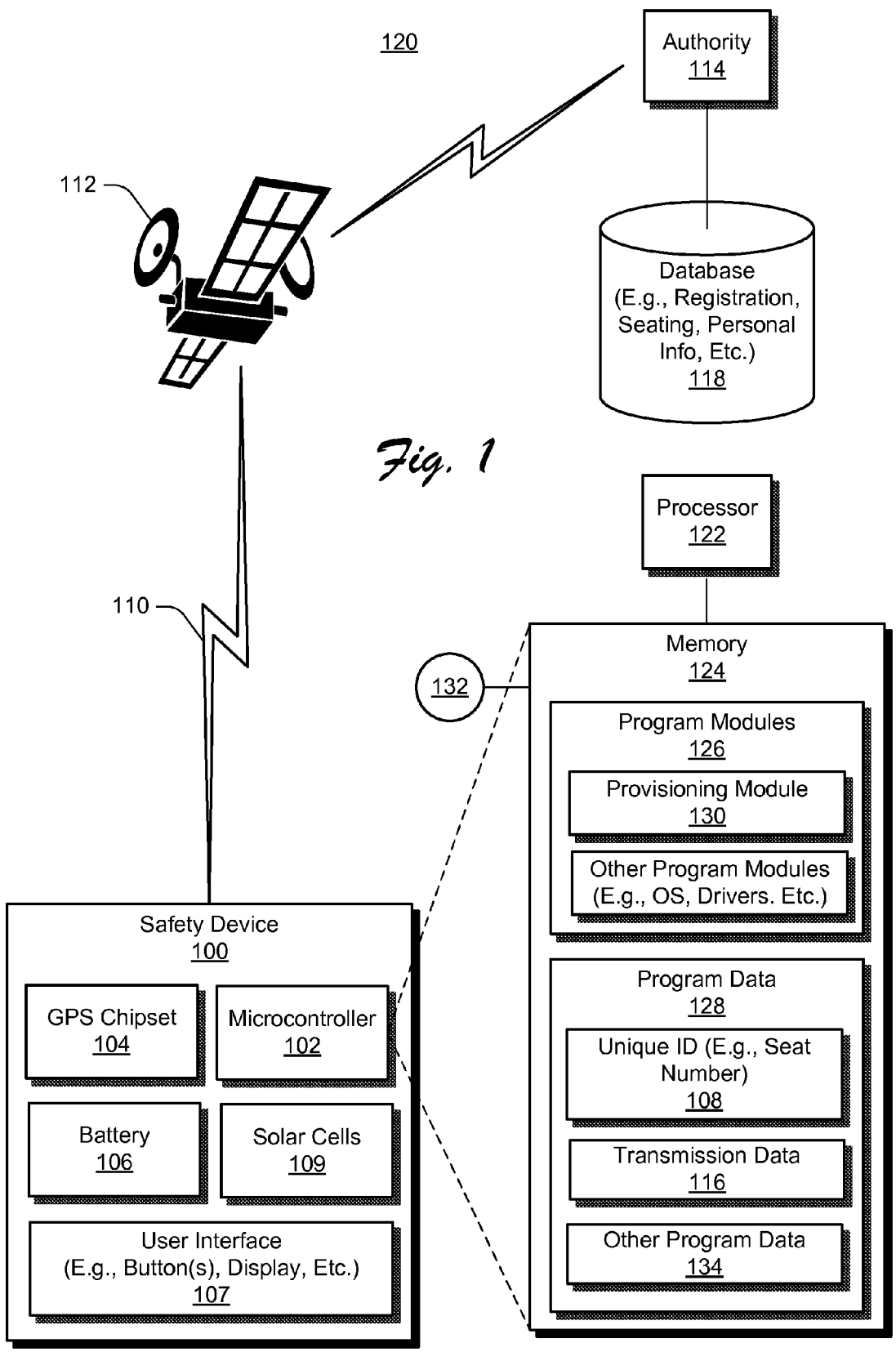

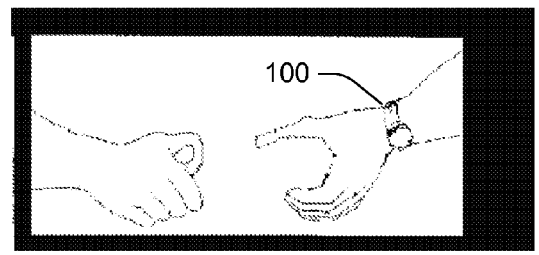
Fig. 2(d)
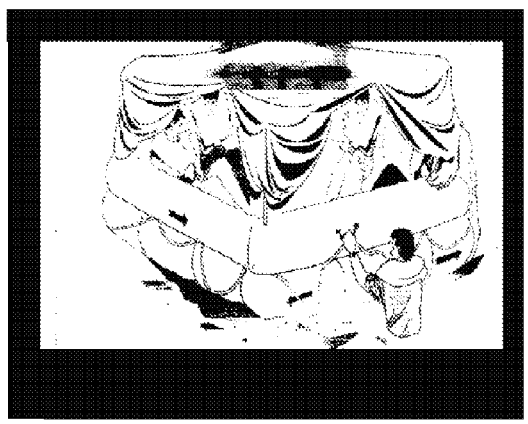
Fig. 2(e)
Fig. 2(f)
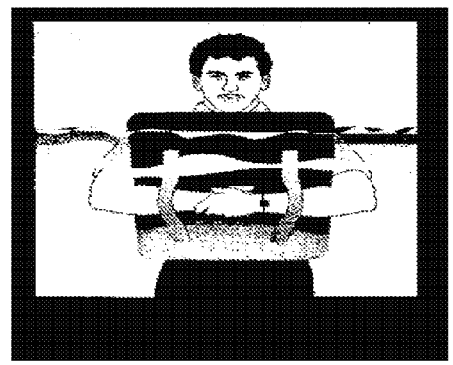

PERSONAL SAFETY AND LOCATOR DEVICE

RELATED APPLICATIONS

This patent application is a Continuation in Part to U.S. patent application Ser. No. 12/697,009, filed on Jan. 29, 2010, and titled "Passengers Searching System in Emergency Situations," which is hereby incorporated by reference. U.S. patent application Ser. No. 12/697,009 claims priority under Paris Convention Priority to Saudi Arabian patent application serial no. 1093000625, filed on Jan. 29, 2009, titled "Search system for passengers in emergency situations," which is also hereby incorporated by reference.

BACKGROUND

Search and rescue operations commonly rely on personal search and rescue devices such as avalanche beacons and transponders to locate people. When activated, such devices usually transmit a code or other signal on a standard international search and rescue radio frequency to provide directional information to a search and rescue team.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, systems, methodology and apparatus for an automatically provisioned personal search and locator device is described. In one aspect, the locator device includes a microcontroller with a processor coupled to the memory comprising computer program instructions executable by the processor that, responsive to activation, detects a seat number for the seat of a plurality of seats coupled to a transportation vehicle. The seat is in proximity to and in association with the tracking apparatus. Additionally, the computer program instructions generate and communicate a signal to a search and rescue center. The signal includes the seat number and location coordinates of the tracking apparatus. The seat number is utilized by the search rescue team to facilitate their operations by determining personal information associated with any passenger assigned to the seat.

BRIEF DESCRIPTION OF THE DRAWINGS

FIG. 1 shows an exemplary system for an automatically provisioned and distributed search and locator device, according to one embodiment.

FIGS. 2(d), 2(e), and 2(f) show a passenger wearing an exemplary automatically provisioned personal passenger safety locator device, according to one embodiment.

DETAILED DESCRIPTION

Overview

Figure 2A:
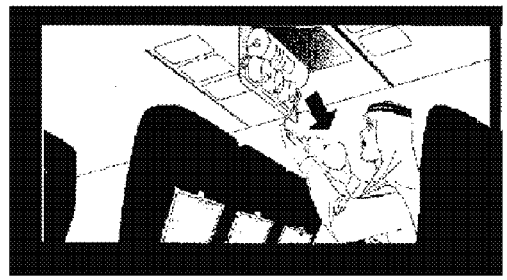
FIG. 2(a) shows an exemplary compartment associated with an emergency oxygen supply system on an airplane for storing and delivering an automatically provisioned personal passenger and safety locator device to a passenger, according to one embodiment.

Conventional off-the-shelf search and rescue devices are substantially limited in their respective implementations. For example, such devices are generally "personal" only in terms of their possession by the person carrying the device on their person. Such devices do not typically provide means for a user or other authority to associate a signal transmitted by the device with personal information and/or characteristics of the person carrying the device. In this context, a search or rescue team typically cannot determine specifics of the person (e.g., name, age, residential address, contact information, citizenship, etc.) that is carrying, or otherwise associated with, a search and rescue device from which beacon signals are being received.

For example, consider a scenario where prior to boarding an airplane, one or more individuals acquire and carry a respective conventional search and rescue device on their person during the flight. If the airplane crashes or makes an emergency landing in a remote and generally inaccessible area, authorities may receive beacon signals from the respective search and rescue devices. In this scenario, search, rescue, and recovery efforts could be facilitated if personal information about each person carrying the search and rescue devices were available. However, because conventional search and rescue devices are substantially limited in their respective implementations, the authorities in such a scenario will typically not have any ability to determine identities or characteristics of the particular passengers carrying, or otherwise associated with, received a search beacon signals.

Additionally, and unless a passenger (an airline passenger, bus passenger, or other type of mass transportation passenger) has personally taken the initiative to acquire and carry a personal search and rescue device, the passenger will generally not have access to such a device in the event of an emergency that may require search, rescue and/or recovery efforts. For example, unless each individual on an airplane personally acquires and carries such a device on their person, respective persons would not have such a device to carry in the instance that the airplane crashes or unexpectedly lands. In an airplane crash, passenger and wreckage may be scattered across a distance from the main impact site for one or more of a multitude of different possible reasons. Search, rescue and recovery teams may not even consider looking in such distant and/or scattered locations until after a complete study of the event has occurred. Such studies generally take time, time that may result in the compromise of any surviving passengers.

The following described systems, apparatus, and methodologies for automatically provisioned and distributed personal safety and locator devices addresses these and other limitations of conventional search and rescue distribution systems and devices. These systems, apparatus and methodologies are related to the field of aerial and naval travel security and safety. The system allows locating passengers of these means of transport in case of an accident occurring. Previous ways of searching for lost passengers were not successful in many cases often because victims are not always near the area of the crash in situations where the passenger abandons the airplane or ship prior to crashing and were able to survive miles away from the site of the crash. Therefore, it will be difficult for search teams to locate the surviving passengers until a careful study of the accident is conducted and a careful examination of the wreckage and site of the crash, which may take hours or days, by which then the survivor will die from malnutrition, starvation or injuries. In other cases, such as crashes occurring due to storms, search and rescue crews are not able to go to the location of the crash until after the storm has calmed which might take several hours or days enough to widen the area of search, something which might prevent rescue teams from reaching those people in time enough to save them. One of the things this system will treat is the deficiency in conventional search methods that rely on search planes, goggles, or rescue boats, which may not be able to spot accident victim(s), e.g., because of poor visibility.

In one implementation, for example, the systems and apparatus facilitate security, safety, search, rescue and recovery of passengers using any transportation vehicle, mass transportation or otherwise, in emergencies. The system: (a) provisions a safety device with unique information for use by search and rescue personnel to identify a corresponding passenger; and (b) automatically, e.g., responsive to an emergency, distributes each safety device to a location proximal to an expected location of the passenger. In one implementation, and responsive to receiving beacon signals from a provisioned and distributed personal safety and locator device, authorities can automatically correlate the unique information with personal information/characteristics of the corresponding passenger. This information in addition to the location information associated with the received beacon signals provides valuable information to search, rescue, and/or recovery teams.

These and other aspects of the system and apparatus for provisioned and distributed personal search and locator devices are now described in detail.

Exemplary System and Apparatus

FIG. 1 shows an exemplary system for automatically provisioned and distributed personal search and locator device 100, according to one embodiment. Hereinafter, device 100 is often referred to as "safety device 100," unless otherwise referred. Safety device 100 may be implemented in any one or more of a number of different configurations, for example, as a band or bracelet (e.g., shaped as a watch) for wearing on the wrist, a glove for wearing, a necklace, with a clasp for attaching or carrying, and/or so on. In one implementation, safety device 100 is made from a fireproof, unbreakable, and/or waterproof material. As illustrated, safety device 100 comprises a processor operatively coupled to a memory (e.g., microcontroller 102), a Global Positioning System (GPS) chipset and antenna (collectively shown as component 104) to transmit and receive signals, a battery 106 and solar cells 109, and a user interface (UI) 107. Battery 106 provides primary operational power to the safety device 100, including the microcontroller 102 and the GPS chipset 104. Solar cells 109 provide secondary operational power to the safety device 100. The UI 107 includes, for example, one or more of the following: a display for presenting information (e.g., directions, maps, etc.) to a user, one or more buttons (e.g., for a user to manually activate a safety device, select a primary or secondary power source, or perform other functions), a light, and/or so on.

In one implementation, safety device 100 also includes a compass to allow a user to locate a particular direction, a mirror for reflective signaling, and/or so on. A compass may assist a user, for example, as follows. An airplane pilot, prior to crashing, may instruct the passengers about the closet safest area and the passengers can use the compass to locate that area. This will benefit the passengers to locate the safest place to help rescue them and this benefits the search and rescue team, to ask "where would the pilot most likely instruct the passengers to go?" By going to the direction where we most likely expect the passengers to be, this will substantially limit the areas of search to facilitate the rescue mission. In one implementation, the light/illuminating source and the safety device 100 can be used to improve visibility of a user at nighttime.

In this implementation, one or more safety devices 100 are installed or loaded in proximity with each seat in a transportation vehicle such as an airplane, bus, boat, and/or so on. For example, in an airplane, a respective safety device 100 is installed in a compartment (FIG. 2) directly above or otherwise proximal to each passenger seat. Each safety device 100 is then manually or automatically provisioned (e.g., at predetermined time or responsive to an emergency such as a drop in air pressure, vehicle rollover, etc.) with a substantially unique identifier ("ID") 108. In one implementation, the unique ID is a seat number. Responsive to a predetermined event (e.g., an emergency, manual release, air pressure change beyond particular pre-configured threshold, etc.), the system provides/supplies/presents each safety device 100 to passenger(s) (FIG. 2) for automatic or manual activation (i.e., initiation of microcontroller 102 operations).

Responsive to activation of safety device 100, and more particularly, responsive to the activation of the microcontroller 102 and GPS chipset 104, battery 106 provides enough power to operate the components of safety device 100. In one implementation, battery 106 provides enough power to operate the safety device 100 for several hours. In one implementation, battery 106 is a primary mobile power system coupled to a secondary mobile power system 109 for recharging the primary power system 106. In one implementation, for example, the secondary mobile power system is a set of small solar cells operatively coupled to the safety device 100 to recharge the battery 106. Activation of the safety device 100 further causes the safety device 100 to begin transmitting beacon signals 110, which include the substantially unique identifier, geographical location information, and/or so on, to authorities 114. In one implementation, the beacon signals 110 are also received and utilized by other distributed safety devices 100, for example, to determine information and/or location of the other respective passengers.

In one implementation, activation operations cause each safety device 100 to send beacon signals 110 to an orbiting satellite system 112 such as the global positioning system (GPS) for subsequent receipt by authorities 114 or other safety devices 100. Transmitted beacon signals for each activated safety device 100 comprise at least longitude and latitude information (a respective portion of "Transmission Data" 116) corresponding to the location of the safety device, and the unique identifier (e.g., seat number, etc.) 108 provisioned to the safety device. Each safety device 100 can be manually provisioned with this unique identifier (as compared to each other safety device's unique identifier). Alternately, the systems and methods automatically provisioned each safety device with a respective unique identifier that can be mapped to a particular location designated for positioning of a passenger on the corresponding transportation vehicle, for example, as described in greater detail below in the section titled "Exemplary Microcontroller."

In one implementation, and responsive to receiving transmitted beacon signals 110, an entity (e.g., an authority 114 such as a computing device, etc.) automatically or manually maps the received unique ID 108 to personal information of someone (if anyone) previously assigned (e.g., by a reservation system, etc.) to sit in the particular seat or otherwise in proximity to the position associated with the safety device 100 on the passenger vehicle (e.g., bus, boat, plane, sector). In one implementation, for example, when the transportation vehicle is a commercial airline, or otherwise, this mapping is accomplished through the personal information and seat number or other reservation information that is typically available via the airline's reservation system database 118.

Exemplary Safety Device Delivery and Activation

Referring to FIG. 2(a), there is shown an exemplary compartment associated with an emergency oxygen supply system on an airplane for storing and delivering an automatically provisioned personal passenger and safety locator device 100 of to a passenger, according to one embodiment. Upon occurrence of one or more predetermined events (e.g., an event typically associated with an emergency such as a drop in oxygen/pressure levels below a certain threshold, etc.), the compartment is automatically (or manually) opened and the safety device is presented to any passenger in or near the open compartment/seat. In one implementation, the device will have a string attached to it which the passenger can detach by a button such as certain medals carried by the hand and when it is twisted in a particular way it will detach. The electronic processor in the safety device may activate automatically in an emergency situation with the dropping of the oxygen masks. In one implementation, a safety device 100 is activated from a remote location (e.g., responsive to received of electronic signals, etc.). Additionally, and in one implementation, there is a manual activation button.

In one embodiment, a safety device 100 is secured and stored in a compartment in relative proximity and above each passenger seat on a transportation vehicle (e.g., airplane, bus, car, boat, etc.). For example, in one implementation, safety device 100 is secured and stored in an emergency oxygen supply system compartment above each passenger seat on an aircraft. When the oxygen supply system detects an emergency drop in pressure in the passenger cabin, the system automatically opens the compartment above each passenger seat to drop masks and respective safety devices 100 to the passengers. A safety device 100 is activated manually or automatically responsive to distribution to a passenger.

There are numerous different ways to activate a safety device 100. In one implementation, for example, a user activates the safety device by pressing a button (e.g., please see the UI 107 FIG. 1). In another implementation, a length of string (or plastic or wire, etc.) is secured at one end inside a safety device holding compartment (e.g., an emergency oxygen supply system on an airplane) to a fixture (e.g., a screw or other retaining device/feature). The other end of the string length is operatively coupled to the safety device 100. In one embodiment, the other end of the string is operatively coupled to the safety device via a friction connection comprising a piece of non-conducting material (e.g., plastic) placed between power circuit completing contacts associated with battery 106. Such placement blocks power activation of battery 106, and thus blocks power from being provided to the microcontroller 102 and GPS chipset 104. Removal of the friction connection provides power to the processing components, and thus, activates safety device 100 operations. In this example, the configurable design/strength of the non-conducting material friction connection determines whether the safety device 100 is activated automatically or manually.

For example, a relatively loose friction connection will result in automatic activation of the safety device 100 responsive to the safety device being dropped from above a seat. That is, weight of the falling safety device at the terminus of the corresponding length of string connecting the safety device from above is sufficient to automatically remove or pull the non-conducting material out from between the battery contacts in a loose friction connection. Here, the safety device is automatically activated with power for operations before it falls onto a corresponding seat, a passenger's lap, or otherwise. In another example, a relatively resilient or strong friction connection will require user/passenger intervention to manually remove non-conductive material from between the battery contacts. That is, weight of a falling safety device at the terminus of the corresponding length of cord/string connecting the safety device from above will not be sufficient to pull the non-conducting material out from between the battery contacts in a resilient friction connection. Here, the passenger removes the connection blocking material from between the battery terminal and a connection to activate the safety device by gently pulling on the safety device away from the connection to the compartment to disengage the connection blocking material.

Figure 2B:
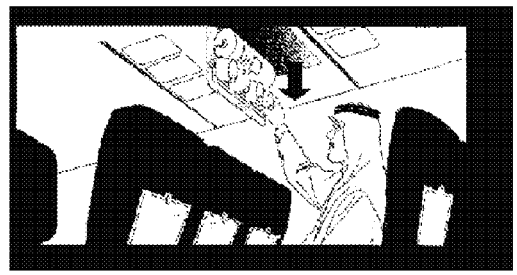
FIG. 2(b) shows a passenger reaching up into a compartment above his seat to manually retrieve an oxygen mask, according to one embodiment. In a similar scenario, the passenger reaches up to manually retrieve an automatically provisioned personal passenger and safety locator device.
Figure 2C:
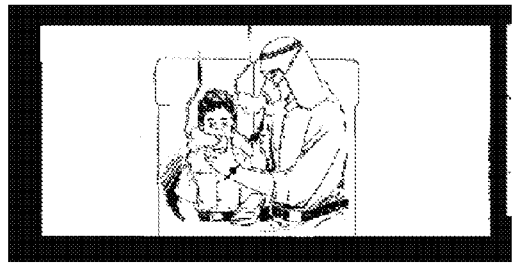
FIG. 2(c) shows a passenger wearing an exemplary automatically provisioned personal passenger and safety locator device, according to one embodiment.

FIG. 2(b) illustrates an exemplary implementation where a passenger reaches up into a compartment to retrieve an oxygen mask. In a similar scenario, for example, the passenger reaches up into the compartment to retrieve an automatically provisioned personal passenger and safety locator device 100. FIG. 2(c) shows a passenger wearing a safety device 100 as a bracelet, according to one embodiment. FIGS. 2(d), 2(e), and 2(f) show a passenger wearing an exemplary automatically provisioned personal safety device 100, according to one embodiment.

Safety device 100 can be made in different shapes so that it will be utilized according to the location of the device in a transportation vehicle such as a plane or ship. For example, the size of a device containing compartment in an airplane or ship may change the shape of the device. There is more than one technique to present a user with such a device and/or carry or attach a safety device (e.g., a bracelet, a necklace with an adjustable size, as a glove, as an attachment to self or another article—e.g., to keep device afloat on the surface of water, etc.).

Exemplary Microcontroller

Referring to FIG. 1, there is shown further details of an exemplary processor coupled to a memory (e.g., microcontroller 102) in a safety device 100, according to one embodiment. As shown, each safety device 100 includes, for example, at least one processor 122 coupled to a memory 124. The memory comprises computer program modules 126 and computer program data 128. The computer program modules include computer-program instructions executable by the processor 122 to implement the operations of the safety device 100.

In one implementation and to provision a safety device 100 with a unique ID 108, and responsive to activation of a safety device 100, GPS chipset 104 begins receiving GPS signals from other power-activated bracelets 100. GPS chipset 104 communicates this received information such as its particular geographical coordinates to provisioning module 130, for example, via an exposed application-programming interface (API) 132. Responsive to receiving this information from GPS chipset 104, provisioning module 130 automatically calculates/determines via a signal separation algorithm a unique ID 108 for the particular safety device 100. The signal separation algorithm takes into consideration the separation between multiple activated bracelets 100 to determine the unique ID 108. In another implementation, an administrator manually sets (e.g., via a button user interface operatively coupled to the safety device) or programmatically uploads the unique ID 108 into the bracelet (e.g., prior to installation into the vehicle, or otherwise). Techniques to programmatically upload information to a microcontroller are known.

An Exemplary Procedure

Figure 3:
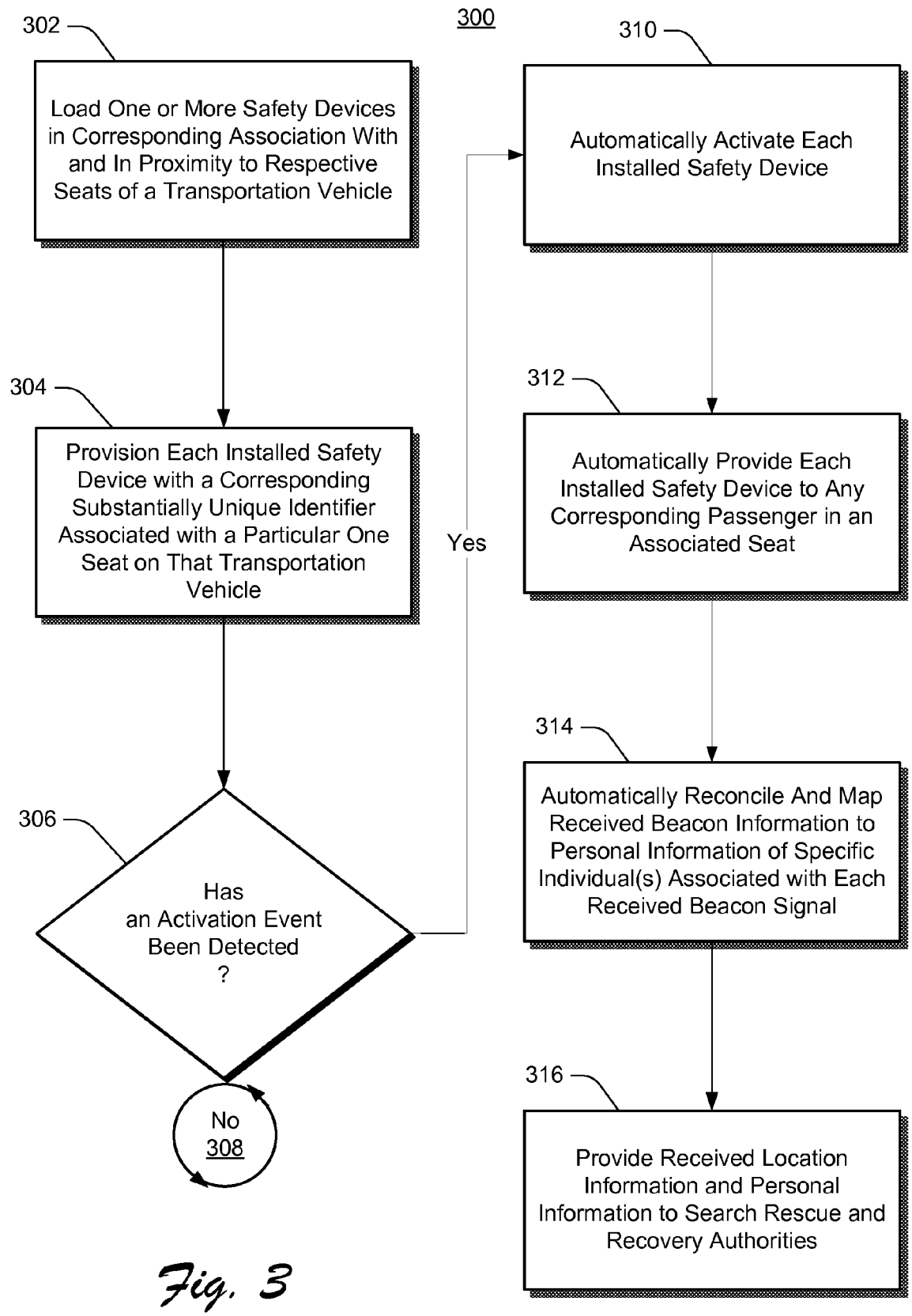
FIG. 3 shows an exemplary procedure for the systems and methods for an automatically provisioned passenger safety and locator device, according to one embodiment.

FIG. 3 shows an exemplary procedure 300 for automatically provisioned and distributed personal safety and locator devices, according to one embodiment. Referring to FIG. 3, at block 302 one or more safety devices 100 (FIG. 1) are installed or loaded in corresponding association and proximity (e.g., above or otherwise in proximity or association with) to respective seats in a transportation vehicle such as an airplane, bus, and/or so on. For example, in an airplane a respective safety device 100 is installed in a compartment directly above each passenger seat in the airplane. Operations of block 304 provision each installed safety device 100 with a substantially unique identifier (e.g., a seat number) 108 (FIG. 1) for mapping to a particular one passenger of one or more passengers. In one implementation, such provisioning is automatic. In another implementation, such provisioning is manual or semi-manual.

Operations of block 306 determine whether an activation event has been detected. In one implementation, and activation event is a trigger event instantiated by a person (e.g., a pilot or driver response to detecting an emergency). In this particular example, the person provides an activation event (shown as respective portion of other program data 134 in FIG. 1), for example, by pressing a button, via voice command, or some other interface to the vehicle system coupled to be installed safety devices. In one implementation, such activation events may be automatically instantiated and contextual based on a particular type of transportation vehicle in which the safety device 100 has been installed. For instance, in one implementation, an activation event is automatically generated responsive to detecting a dangerous/threshold pressure drop in an airplane cabin. Such automatic threshold-pressure-drop-detection is common, for example, in systems for deploying oxygen masks to passengers responsive to a dangerous drop in airplane cabin pressure. If no activation event has been detected, operations of procedure 300 continue at block 308, where the system continues to monitor or poll for receipt of a safety device activation event. On the other hand, if an activation event is detected, operations of procedure 300 continue at block 310.

Operations at block 310 automatically activate each installed safety device 100 such that each device began sending substantially unique beacon signals 110 (FIG. 1) to an orbiting satellite system 112 such as the GPS system for receipt by an authority 114 (FIG. 1) designated to begin search, rescue, and recovery operations in an emergency. Transmitted beacon signals for each activated safety device 100 comprise at least longitude and latitude information (a respective portion of transition data 116 received from GPS chipset 104) corresponding to the location of the safety device, and the substantially unique identifier (e.g., seat number) 108 provisioned to the safety device.

Operations of block 312 automatically provide or present each installed (and now active) safety device 100 to any corresponding passenger in the seat with which the safety device is associated. These devices are provided to the passenger(s) so that the passengers may wear, attach, or otherwise carry the devices with them in the emergency to facilitate subsequent search, rescue, or recovery. In this manner, and in contrast to conventional systems and techniques in these contexts, each passenger of a transportation vehicle such as a mass transportation or other vehicle will automatically have access to a personal search and rescue device 100 in an emergency. In one implementation, the operations of block 310 and block 312 are combined responsive to detection of an activation event (block 306). In this scenario, for instance, installed safety device(s) 100 are automatically released or otherwise presented to any corresponding passenger(s) such that the act of presenting/releasing the safety device(s) to passenger(s) results in activation of the device(s).

Operations of block 314 automatically or otherwise map received safety device 100 beacon signals 110 to a corresponding passenger in the associated transportation vehicle. In one implementation, the system of FIG. 1 is operatively coupled to a reservation and seat assignment system (e.g. a reservation system) to automatically reconcile the substantially unique information (e.g., a seat number) in each received beacon signal to particular passenger information in a database 118 (FIG. 1) associated with the seat over which the safety device 100 was installed in the vehicle. Operations of block 316 provide the reconciled/mapped information along with the received location information for each distributed safety device 100 to search and rescue and recovery authorities. In this manner, each passenger of a transportation vehicle is provided with a corresponding personal search rescue and safety device 100. Moreover, search rescue and recovery teams can obtain information about the probable individual carrying or otherwise associated with each of one or more distributed personal search rescue and safety devices 100.

Conclusion

Although the above sections describe a provisioned and distributed passenger safety and locator device in language specific to structural and operational features, the implementations defined in the appended claims are not necessarily limited to the specific described features and operations. Rather, the specific features for the automatically provisioned passenger safety and locator device are disclosed as exemplary forms of implementing the claimed subject matter.

The invention claimed is:

1. A personal search and locator device ("tracking apparatus") comprising:
   a microcontroller including at least one processor coupled to a memory, the memory comprising computer-program instructions executable by the processor to perform steps comprising:
      responsive to activation:
         detecting a seat number for a single seat from a plurality of seats coupled to a transportation vehicle, the step of detecting the seat number configured to automatically provision only the single seat as in proximity to and in association with the tracking apparatus; and
         generating and communicating a signal to a search and rescue center, the signal comprising the seat number and location coordinates of the tracking apparatus, the seat number for reconciling with reservation information to identify personal information associated with any passenger assigned to the seat.

2. The tracking apparatus of claim 1, wherein the seat number is preconfigured in the memory.

3. The tracking apparatus of claim 1, wherein the seat number is automatically determined and stored in the memory responsive to power activation of the tracking apparatus.

4. The tracking apparatus of claim 1, wherein the tracking apparatus is made from a material that is one or more of fireproof, substantially resistance to breakage, and waterproof.

5. The tracking apparatus of claim 1, wherein the tracking apparatus is operatively coupled to a compartment associated with an oxygen mask such that upon release of the oxygen mask to a passenger in the seat, the tracking apparatus is also delivered to the passenger.

6. The tracking apparatus of claim 1, wherein the tracking apparatus is a bracelet configured to be worn on a passenger wrist, a glove, or a necklace.

7. The tracking apparatus of claim 1, wherein the tracking apparatus comprises a compass configured to present a direction of travel to a viewer.

8. The tracking apparatus of claim 1, wherein the tracking apparatus comprises a mirror configured to reflect light as a signal.

9. The tracking apparatus of claim 1, wherein the tracking apparatus comprises a global positioning system chip set.

10. The tracking apparatus of claim 1, wherein the tracking apparatus comprises a secondary power source operatively configured to provide power to components of the tracking apparatus.

11. The tracking apparatus of claim 10, wherein the secondary power source is a set of photovoltaic energy cells.

12. A system for search, rescue, and recovery of one or more vehicle passengers, the system comprising:
 a safety device;
 a set of satellites;
 a search, rescue, and recovery authority;
 wherein the safety device comprises:
  a processor operatively coupled to a memory, the memory comprising computer-program instructions executable by the processor to:
   automatically provisioning the safety device with a unique identifier;
   automatically send the unique identifier in combination with geographical coordinates corresponding to the location of the safety device to the set of satellites for communication to the search, rescue, and recovery authority ("authority"), the unique identifier corresponding to a particular one passenger of the one or more vehicle passengers; and
  wherein, responsive to receiving the unique identifier and the geographical coordinates, the authority determines characteristics of the particular one passenger to facilitate any search, rescue, and recovery operations for the particular one passenger.

13. The system of claim 12, wherein the unique identifier is a seat number.

14. The system of claim 12, wherein the set of satellites represents a respective portion of a global positioning system.

15. The system of claim 12, wherein the characteristics are determined from a passenger reservation system.

16. The system of claim 12, wherein the system further comprises;
 a transportation vehicle; and
 a delivery system, the delivery system providing the safety device to the particular one passenger responsive to one or more events.

17. The system of claim 16, wherein the one or more events comprise a predetermined threshold drop in oxygen level in the transportation vehicle.

18. The system of claim 16, wherein the one or more events comprise a manual activation event from a user.

19. The system of claim 16, wherein the transportation vehicle is airplane, bus, or a boat.

* * * * *